May 13, 1941. H. C. DEHRING 2,241,657

SUPPORTING BRACKET

Filed Aug. 12, 1939

Inventor
Herbert C. Dehring

Patented May 13, 1941

2,241,657

UNITED STATES PATENT OFFICE 2,241,657

SUPPORTING BRACKET

Herbert C. Dehring, Genoa, Ohio

Application August 12, 1939, Serial No. 289,733

6 Claims. (Cl. 248—247)

My invention relates to supporting brackets and particularly to the type of bracket for holding or supporting raceways and other articles above a baseboard or near a moulding.

Heretofore raceways and similar articles have been fastened to a wall or baseboard by screwing or nailing them to the wall or baseboard. In the present day construction many walls are made of metal, stone or other material so that it is practically impossible to fasten raceways or other articles by nailing or screwing them to the wall, baseboards or mouldings. My novel supporting bracket provides a means for fastening raceways and the articles regardless of the kind of wall, baseboard or moulding.

One object of my invention is to provide a supporting bracket that can be used with all kinds of building material such as stone, brick, metal, wood and many others.

Another object of my invention is to provide a supporting bracket that is inexpensive to manufacture.

Another object of my invention is to provide a supporting bracket that is inexpensive to install.

Another object of my invention is to provide a supporting bracket that readily adapts itself to quantity production.

Another object of my invention is to provide a supporting bracket that has a minimum number of parts.

Another object of my invention is to provide a supporting bracket that is rigid and durable.

With these and other objects in view, my invention consists in the construction, combination and arrangement of the various parts of my improved device as described in the specification, claimed in the claims, and illustrated in the accompanying drawing.

Figure 1:
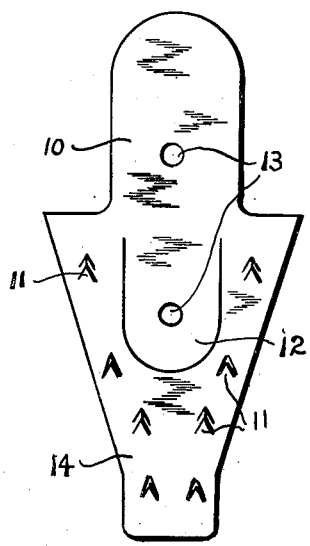
Fig. 1 is a plan view of my novel supporting bracket in a partially finished stage.
Figure 2:
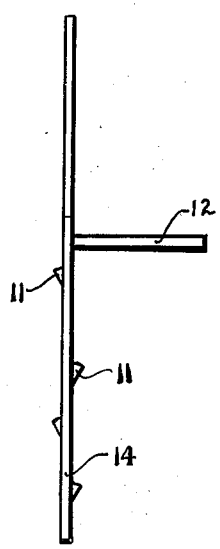
Fig. 2 is a side view of my novel supporting bracket.
Figure 3:
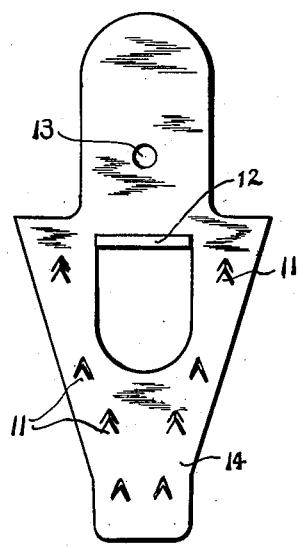
Fig. 3 is a front view of the bracket shown in Fig. 2.

Referring to the drawing, I have shown in Fig. 1 my novel supporting bracket in a partially finished form. The part 10 is stamped from a plain sheet of metal. Lugs 11 are stamped in the part 10. A substantially large section 12 is stamped or sheared from the part 10 and is then bent substantially at right angles to the remainder of the bracket as shown in Figs. 2 and 3. Holes 13 are stamped in the bracket. These holes 13 may or may not be threaded.

Figure 4:
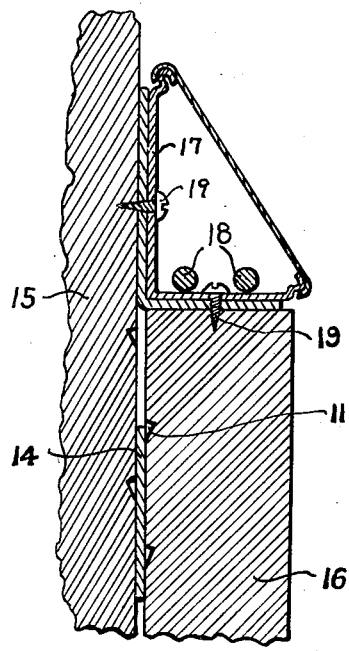
Fig. 4 is a sectional view showing an installation of my novel supporting bracket.
Figures 6, 7:
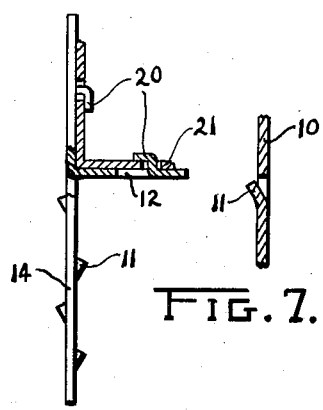
Fig. 6 is a view partially in section showing a portion of a raceway fastened to my novel form of bracket shown in Fig. 5.
Fig. 7 is a sectional view taken through one of the lugs.

Thus it will readily be seen than an angular section is formed provided with a dependent member 14. The dependent member is provided with lugs 11 so inclined that they readily allow being pushed or pounded between a wall and a baseboard or moulding as shown in Fig. 4. Fig. 7 is a sectional view showing the construction of the lug 11. Once the supporting bracket is installed it can readily be seen that the lugs 11 would resist any force tending to remove the bracket.

Fig. 4 shows one of my novel supporting brackets installed between a wall 15 and a baseboard 16. A raceway 17 carrying electric wires 18 has been fastened to the bracket by means of the sheet metal screws 19.

In installations were the wall and baseboard are such that they cannot be penetrated by sheet metal screws the holes 13 can be threaded and then the raceway 17 can be fastened to the bracket by means of short screws that engage with the threads of the holes 13 but do not penetrate the wall or baseboard.

Figure 5:
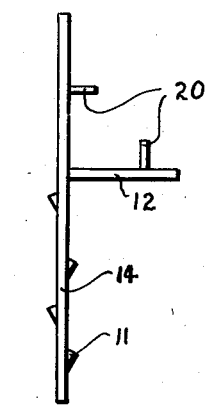
Fig. 5 is a side view of another form of my novel supporting bracket.

Fig. 5 discloses a form of my novel supporting bracket that is provided with lugs 20. These lugs 20 can be inserted in slots or holes of raceways or other articles and then bent over as shown in Fig. 6. Thus a raceway 21 can be secured to the bracket without the use of nails or screws.

From the foregoing description it can readily be seen that my novel supporting bracket has many applications. It is simple, durable, strong and inexpensive. It does not require any machining. It readily lends itself to quantity production because it is a single stamping and consequently requires no assembling. My novel supporting bracket can be used for a wide range of purposes and it requires no skill to install it.

It can readily be seen that several modifications of my invention can be made. While I have described several forms of my invention it is to be understood that I am not to be limited to these details except by the scope of the appended claims.

Having thus described my invention what I claim is:

1. A supporting bracket for raceways comprising a T-shaped stamping, said T-shaped stamping having; a substantially right angle section, a dependent member extending from said right angle section, said dependent member being provided with lugs for securing said dependent member between a mopboard and a wall, and a means for fastening a raceway to said supporting bracket.

2. A supporting bracket for raceways comprising a unitary T-shaped stamping, said stamping having; an angular section, a dependent member extending from said angular section, said dependent member being provided with lugs for securing said dependent member between a mopboard and a wall, and a means for fastening a raceway to said supporting bracket.

3. A supporting bracket comprising, a unitary stamping, said stamping having a substantially right angle section, lugs protruding from said right angle section adapted to fasten a raceway or other article to said bracket, a flat member extending from said right angle section adapted to be inserted between two substantially flat surfaces and a means adapted to hold said supporting bracket in position.

4. A supporting bracket for raceways, comprising a flat section, a dependent finger struck substantially at right angles to said flat section, a series of lugs struck from the proximity of one end of said flat section adapted to hold said supporting bracket in position after said end of said flat member provided with said lugs has been inserted between a mopboard and a wall, and a plurality of dependent fingers struck from said dependent finger and from said flat section adapted to be inserted in the slots of said raceway and then bent for securing said raceway in position.

5. A stamped bracket for supporting raceways comprising a flat member, a large dependent finger struck from said flat member intermediate its ends at substantially right angles to said member, a plurality of lugs struck from the lower end of said flat member for holding said stamped bracket in position after said lower end of said bracket has been inserted between a mopboard and a wall, and a plurality of small dependent fingers struck from the proximity of the upper end of said flat member and from said large dependent finger adapted to be inserted in a slot of said raceway and bent to secure said raceway in position.

6. A stamped bracket for supporting raceways comprising a flat portion, a dependent portion struck at substantially right angles to said flat portion, a dependent finger struck from said dependent portion, a dependent finger struck from said flat portion above said dependent portion, said dependent fingers adapted to secure a raceway to said bracket, and a plurality of lugs struck from said flat portion below said dependent portion for holding said bracket in position after it is installed between a mopboard and a wall.

HERBERT C. DEHRING.